United States Patent [19]

Fujishita et al.

[11] Patent Number: 5,460,031
[45] Date of Patent: Oct. 24, 1995

[54] KNOCKING DETECTION METHOD FOR INTERNAL COMBUSTION ENGINES AND IGNITION TIMING CONTROL METHOD THEREFOR

[75] Inventors: Masakatsu Fujishita, Mito; Masahiro Sato, Katsuta, both of Japan

[73] Assignees: Hitachi, Ltd., Tokyo; Hitachi Automotive Engineering Co., Ltd., Ibaraki, both of Japan

[21] Appl. No.: 128,687

[22] Filed: Sep. 30, 1993

[30] Foreign Application Priority Data

Sep. 30, 1992 [JP] Japan .................. 4-261075

[51] Int. Cl.$^6$ .................................................. G01H 1/00
[52] U.S. Cl. ................................... 73/35.03; 123/425
[58] Field of Search ................................ 123/425, 435; 73/35

[56] References Cited

U.S. PATENT DOCUMENTS

| | | | |
|---|---|---|---|
| 4,527,525 | 7/1985 | Mauermann et al. | 123/425 |
| 4,991,553 | 2/1991 | Kurihara et al. | 123/425 |
| 5,115,779 | 5/1992 | Itoyama | 123/425 |
| 5,134,980 | 8/1992 | Sakakibara et al. | 123/425 |

FOREIGN PATENT DOCUMENTS 58-45520  3/1983  Japan.

OTHER PUBLICATIONS

Patent Abstracts of Japan, vol. 7, No. 127 (P–201) (1272); Jun. 3, 1983; English Abstract of JP 58–45520.

Primary Examiner—Tony M. Argenbright
Attorney, Agent, or Firm—Evenson, McKeown, Edwards & Lenahan

[57] ABSTRACT

An engine knocking detection method for detecting a knocking from a plurality of characteristic frequency components indicative of a knocking condition is provided. False information indicating a false knock occurrence due to an abnormal drop of the background level to be compared with the characteristic components is eliminated. Information indicating an occurrence of a knocking is extracted through comparison of the characteristic components and corresponding background levels. The background levels are compared with corresponding lower limiters when no knocking is taking place. When any one of the background levels is smaller than a lower limiter corresponding thereto, the lower limiter is adopted and set as a new background levels drops abnormally, a corresponding lower limiter thereof is effected to replace the faulty background level, thereby false information indicating the occurrence of a false knocking is prevented from being generated.

8 Claims, 17 Drawing Sheets

STEP 106

$$BGL_{mean} = \frac{1}{m} \sum_{k=1}^{m} \frac{BGL_{upk} + BGL_{BPk}}{2}$$ — 114

$$BGLMT_i = \frac{1}{n} \cdot BGL_{mean}$$ — 115

STEP 109

$f_i = 6.3 kHz$

| Ne / CYL-INDERS | 600 | | | 3000 | | | | 6000 |
|---|---|---|---|---|---|---|---|---|
| 1cyl | | | | | | | | |
| 2cyl | | | | | | | | |
| 3cyl | | | | BGLMT | | | | |
| 4cyl | | | | | | | | |
| 5cyl | | | | | | | | |
| 6cyl | | | | | | | | |

NUMBER OF CYLINDERS = 3

| $Ne$ / $f_i$ | 600 | --- | --- | 3000 | --- | --- | --- | 6000 |
|---|---|---|---|---|---|---|---|---|
| $f_1$ | | | | | | | | |
| $f_2$ | | | | | | | | |
| ⋮ | | --- | --- | BGLMT | --- | --- | --- | |
| | | | | | | | | |
| | | | | | | | | |
| $f_n$ | | | | | | | | |

Ne = 3000rpm

| $f_i$ / CYL-INDERS | $f_1$ | | | | $f_i$ | | | | $f_n$ |
|---|---|---|---|---|---|---|---|---|---|
| 1cyl | | | | | | | | | |
| 2cyl | | | | | | | | | |
| 3cyl | | | -------- | -------- | BGLMT | -------- | -------- | | |
| 4cyl | | | | | | | | | |
| 5cyl | | | | | | | | | |
| 6cyl | | | | | | | | | |

KNOCKING DETECTION METHOD FOR INTERNAL COMBUSTION ENGINES AND IGNITION TIMING CONTROL METHOD THEREFOR

BACKGROUND OF THE INVENTION

1. Field of the Invention

The present invention relates to a detection method for detecting knocking in an internal combustion engine and an ignition timing control method utilizing said detection method.

2. Description of Prior Art

As is well known, knocking is a phenomenon resulting from a self-ignition of unburned gas remaining in the extremity region of the combustion chamber, and causing vibration in the gas inside the combustion chamber, consequently propagating thus generated vibration to the engine body itself.

Since this knocking gives rise to a loss of energy in the engine output, exerts mechanical shock on the components of the engine as well as lowers the fuel consumption and the like, it is desired to be avoided as much as possible. For this purpose, it is indispensable for a precise detection of the occurrence of a knocking to be ensured to be made.

Reflecting such requirements, there has been proposed a prior art as set forth in the Japanese Patent Laid-open No. 58-45520/1983 wherein the occurrence of knocking is detected by going through the steps of separating a single resonance frequency component in the range of 5 to 12 kHz in the output signals from the vibration detection sensor with a band pass filter, integrating the output thereof, and determining whether an integrated value is greater than the background level thereof.

However, such knocking detection method based on the single resonance frequency component involves such problems that the background level thereof becomes larger at a faster the engine speed thereby preventing a precise detection of knocking, and that the knocking resonance frequencies tend to change with varying engine data, thereby impeding precise detection of knocking.

DESCRIPTION OF THE INVENTION

Therefore, in order to solve the problems associated with the prior art, the inventors of the present invention have proposed a knock detection method as set forth in the Japanese Patent Laid-open No. 3-47449/1991 wherein the detection of knocking is carried out by sampling a plurality of resonance frequency components.

This knock detection method has been very innovative and successful in realizing a high precision knock detection, and thus has been highly appraised and accepted by the related industry.

Reflecting recent demands for further improvements in fuel consumption, exhaust emission cleaning capabilities and the like, many attempts to increase the compression ratio in the engine are under way. Increased compression ratios, however, in turn tend to cause a knocking readily to occur, thereby demanding further efforts to improve the knock detecting precision.

It has become obvious for the knocking detection method comprising the step of sampling a plurality of resonance frequency components to be material to solve the following problems in order to further improve the knocking detection precision thereof.

Namely, for an engine having a poor frequency characteristic, there exist such operational conditions and frequency bands which cause the background level thereof to temporarily or continuously change, for example, to decrease, depending on the performance of the vibration sensors employed, or positions of attachment thereof and the like.

Therefore, when there occurs that, for example, a background level utilized as a parameter for detecting the occurrence of knocking becomes abnormally small, there may be formed a false signal indicating an occurrence of knocking in at least one of the frequency bands of the plurality of resonance frequencies, notwithstanding that actually no knocking is caused therein.

Thereby, when there is formed a false signal indicating an occurrence of knocking at least in one of the frequency bands, nevertheless, in the plurality of resonance frequencies to be sampled for a precise detection of knocking, this false signal adversely affects the whole knocking determination performance over these resonance frequencies, consequently impeding further to improve the knocking detection precision.

One of the features of the present invention resides in comprising the steps of: sampling a plurality of characteristic components indicative of knocking from physical quantities relating to an internal combustion engine and their corresponding comparison components to be defined on the basis of the hereinabove physical quantities; extracting information on the knocking from a relationship between the plurality of characteristic components and their corresponding comparison components; and, in case when any one of the comparison components is not in an allowable range of value or below a limit comparison component thereof which is determined separately, substituting the limit comparison component therefor.

Another feature of the invention resides in that a respective limit comparison component is adapted to be used corresponding to its associated characteristic component.

Still another feature of the invention resides in that a particular limit comparison component is adapted to be used in common for the plurality of characteristic components.

Since when any comparison component, i.e., background level varies abnormally a limit comparison component is adapted to be used instead of the abnormally varying comparison component, information on knocking is ensured to be obtained from the relationship between the limit comparison component and the characteristic component as well, thereby eliminating an issuance of abnormal information on knocking, thus improving the detecting precision of knocking.

BRIEF DESCRIPTION OF THE DRAWINGS

The invention will be described more particularly in the following with reference to the accompanying drawings, in which.

DESCRIPTION OF PREFERRED EMBODIMENTS

With reference to the accompanying drawings, one embodiment of the invention will be set forth in detail in the following.

At first, the knocking determination principle of the invention for determining an occurrence of a knocking will be explained. There are contained various vibration components in the vibration of an engine. Such vibration components include, for example, those caused by piston friction, crank shaft rotation, valve operation and the like. In addition, these vibrational components tend to vary responsive to engine conditions.

When knocking occurs in the engine, a characteristic vibration specific to knocking is generated. Thereby, determination of a knocking occurrence is realized by separating the characteristic vibration inherent to knocking from the whole vibration components of the engine detected by the vibration sensor.

Figure 2:
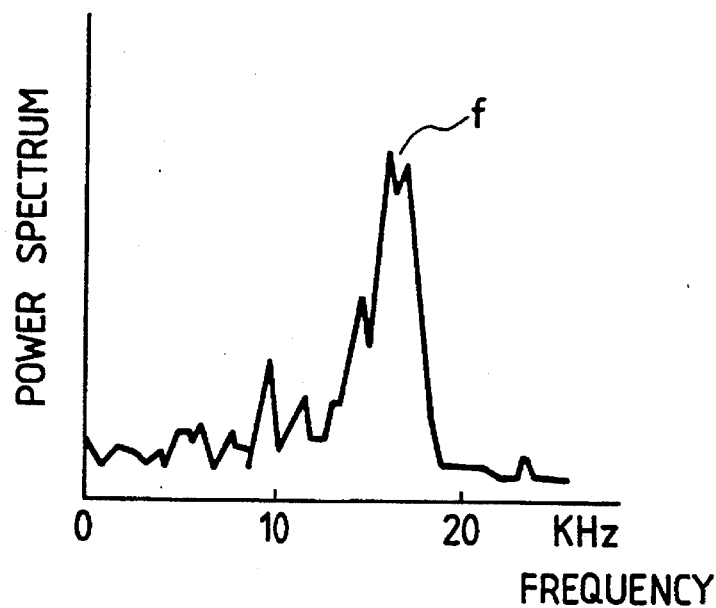
FIG. 2 is a vibration waveform diagram without any knock generation.

FIG. 2 shows a result of frequency analysis of an output frequency component from a vibration sensor when no knocking is present. On the other hand, FIG. 3 shows a result of frequency analysis of an output frequency component from the vibration sensor when knocking is present.

Figure 3:
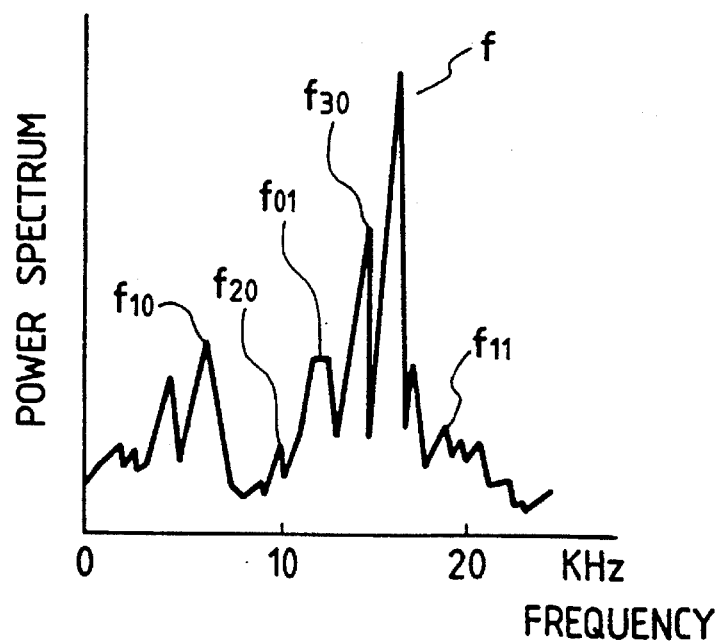
FIG. 3 is a vibration waveform diagram with a knock generation.

As is obviously understood from the comparison of FIGS. 2 and 3, in the case where knocking is present, respective resonance frequency components tend to become larger than in the case where no knocking is present.

Next, with reference to FIGS. 4 and 5, a knocking occurrence determination method utilizing a knocking determination vector index will be described in the following. The operational principle of the invention will be described by way of example of resonance frequency components $f_{10}$(6.3 kHz) and $f_{01}$(13.0 kHz). They are, however, not limited thereto, and at least two of any resonance frequency components may be utilized for determining a knocking occurrence.

The vibration sensor detects a vibration which has been synthesized by combining a vibration component due to a knocking occurrence and one due to a background thereof. Thereby, when there is no knocking a knocking determination index I becomes an index $I_b$ which is defined by the background vibration, while when there is knocking it becomes an index I which is defined so as to include the background vibration $I_b$ and a vibration component $I_k$ due to the occurrence of knocking.

The hereabove knocking determination index I can be formularized into the following equation including major resonance frequency components.

$$I=\omega_{10}P(f_{10})+\omega_{20}P(f_{20})+\omega_{01}P(f_{01})+\omega_{30}P(f_{30})+\omega_{11}P(f_{11}) \quad \ldots (1)$$

where, $\omega$ is a real value to be determined by an engine speed. Further, it may take a binary value of 1 or 0. P represents power spectra of respective resonance frequency components.

Figure 4:
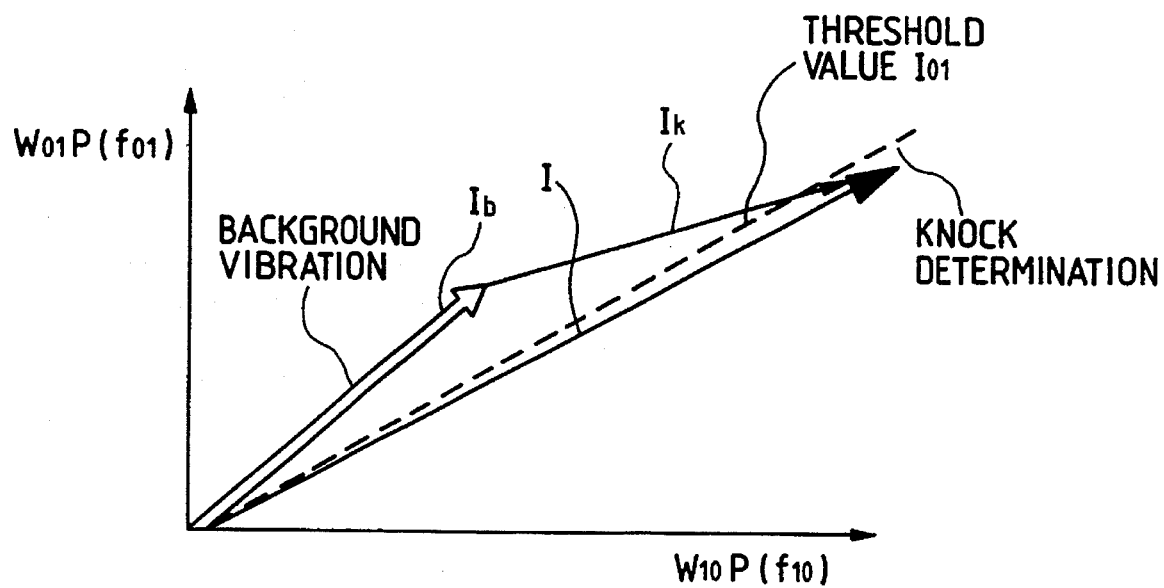
FIG. 4 illustrates spectrum intensity of a knocking.
Figure 5:
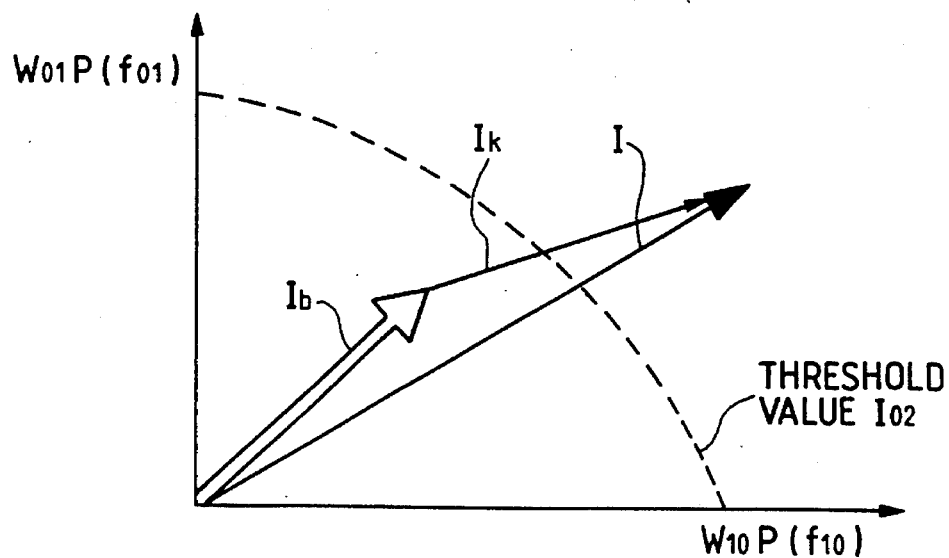
FIG. 5 illustrates another spectrum intensity of a knocking.

As shown in FIG. 4, the knock determination vector index $I_b$ which is expressed by the resonance frequency components of the background vibrations and the index $I_k$ which is expressed by the resonance frequency components of the vibration resulting from the occurrence of a knocking have a different direction and magnitude from each other. This is because that, as in the audible test in which the occurrence of a knocking is identified by a crunching noise, there is involved a change in noise tone when a knocking occurs.

When the vibration component due to the occurrence of a knocking is added to the background vibration, the knock determination index I according to $f_{01}$, $f_{10}$ included in the original from the vibration sensor falls in a range below a knock determination threshold value $I_{01}$ in FIG. 4, and outside a dotted arch line of a threshold value $I_{02}$ in FIG. 5, thus enabling determination of the occurrence of knocking.

Further, in the present invention, any set of the plurality of resonance frequency components included in the output from the vibration sensor and utilized in combination, not limiting to the five elements on the right-hand term of Equation (1), is prescribed to be a knocking determination index.

When such a knocking determination index is utilized, the occurrence of any knocking is ensured to be determined even if a background vibration increases significantly since the composition of a characteristic frequency component indicative of a knocking relative to its corresponding background vibration is taken into consideration.

As set forth previously, there are some operational conditions and frequency bands where the background level decreases temporarily or continuously depending on the quality of the vibration sensors employed or their attachment positions, consequently causing a false signal indicative of the occurrence of a false knocking notwithstanding actually no knocking being present.

When attempting to obtain energy of the knocking resonance frequencies on the basis, for example, of a signal/noise (background) ratio, i.e., S/N ratio, an abnormal decrease in the background level in one of the resonance frequencies will cause its S/N ratio to become abnormally larger, which eventually affects the total determination processing thereof on the basis of the plural resonance frequencies, in effect curbing the efforts to improve the knocking detection precision.

In order to solve the hereinabove problems associated with the prior art, when a particular background level corresponding to at least one of the resonance frequencies decreases abnormally, the present invention is adapted not to utilize the abnormally decreased background level but to utilize a predetermined limit value, for example, background lower limiter.

In the following, a knocking detection method embodying the invention constituting a key portion thereof will be described in detail.

Figure 6:
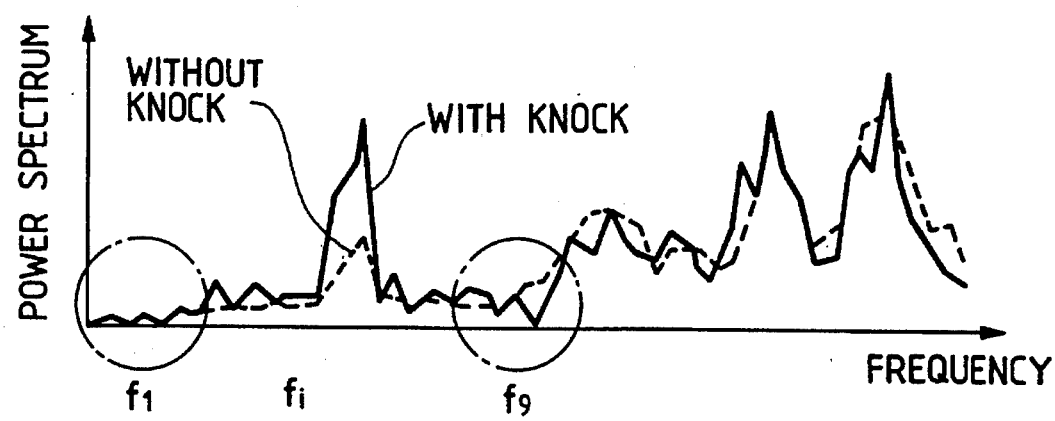
FIG. 6 illustrates power spectra with and without any knock generation.

FIG. 6 shows power spectra relative to the frequencies, in which the occurrence of a knocking is indicated by a curve represented by a solid line, while the non-occurrence thereof is represented by broken lines. It is clearly shown that power spectra of respective resonance frequency bands are increased due to the occurrence of knocking.

Figure 7:
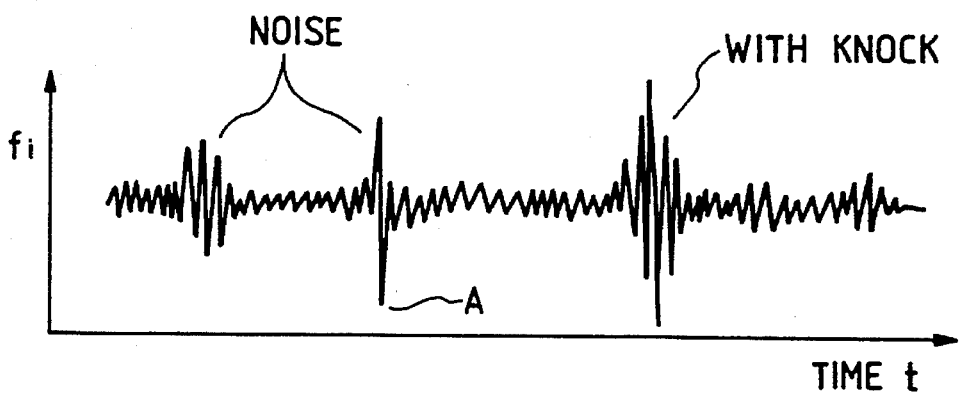
FIG. 7 is a vibration waveform diagram.
Figure 8:
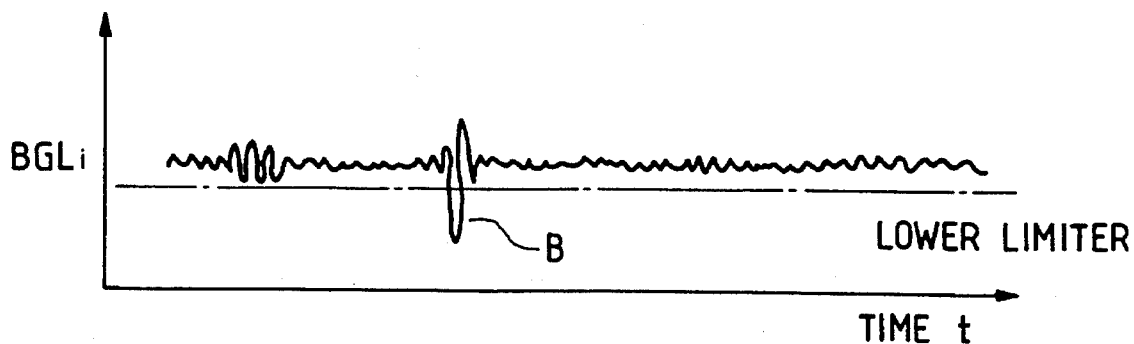
FIG. 8 is a background level diagram.
Figure 9:
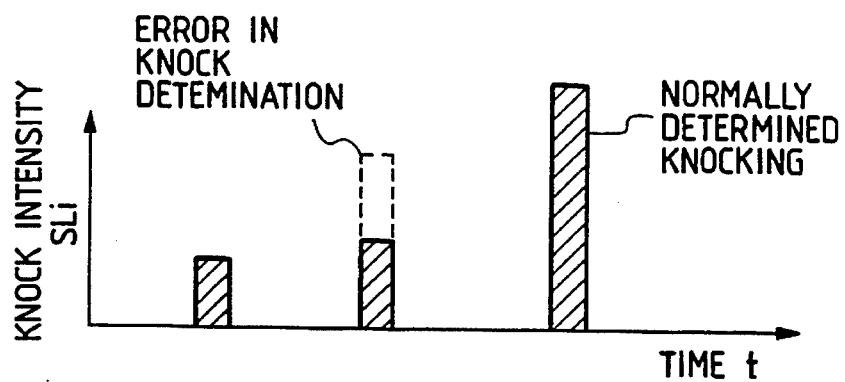
FIG. 9 shows a knock determination diagram.

However, in case there exist characteristic frequencies inherent to a knocking having smaller power spectra as shown by $f_1$ and $f_9$, or in case there exist greater noise components depending on the nature of the engine as shown by A in FIG. 7, there occurs such a phenomenon as shown by B in FIG. 8 in which the background level is caused to drop abnormally.

Thereby, there has been a problem that an S/N ratio becomes abnormally large, eventually causing a final knocking determination index to be deviated, thereby giving rise to an erroneous judgment.

Thereby, it is arranged according to the invention to eliminate erroneous judgment on knocking by setting a lower limiter as shown by broken lines with respect to the background level in FIG. 8.

First, with reference to FIG. 1, the operation of a knocking occurrence determination process in a CPU according to the invention will be described in the following.

Figure 1:
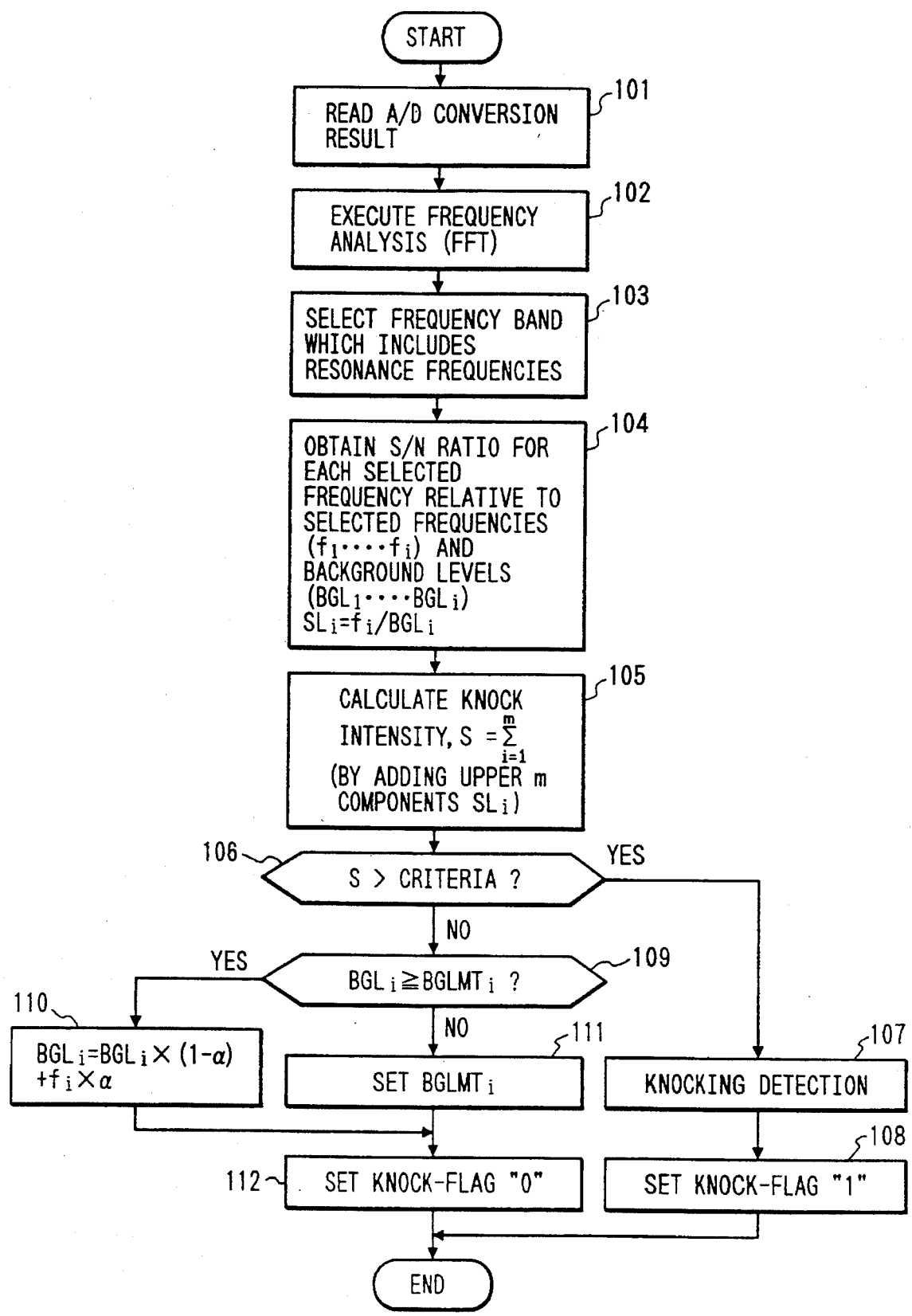
FIG. 1 is a flowchart illustrating a knocking detection method of one embodiment of the invention.

The flowchart in FIG. 1 is executed for every detonation per cycle, and is activated by interrupting the CPU.

In step 101, an output signal from the vibration sensor is read after its analog to digital conversion in an A/D converter.

In the next step 102, a frequency analysis of the analog-to-digital converted signal from the vibration sensor is executed. This frequency analysis is carried out through a transform method such as the fast Fourier transform or Walsh transform.

Then, in step 103, a plurality of frequency bands each containing a resonance frequency are selected from the signals which have been subjected to the frequency analysis. In this embodiment of the invention, a total of eight resonance frequency bands are selected.

Upon selection of preferred frequencies at step 103, in the next step 104 an S/N ratio indicative of a power spectrum is obtained for each selected frequency.

Namely, there are obtained a plurality of selected frequencies ($f_1 \ldots f_i$), i.e., $f_1 \ldots f_8$ in this embodiment, and a plurality of corresponding background levels ($BGL_1 \ldots BGL_i$), i.e., $BGL_1 \ldots BGL_8$ in this embodiment, then an S/N ratio $SL_i=f_i/BGL_i$ is obtained for each frequency selected.

Therefore, in this embodiment of the invention, there are obtained respectively, $SL_1=f_1/BGL_1, \ldots, SL_8=f_8/BGL_8$ In the next step 105, a knock strength is obtained by sampling m numbers, in this embodiment 5, from the selected frequencies which are ordered in the decreasing order of S/N ratios. An equation to obtain this knock strength is expressed for example as follows, whereby the S/N ratio is obtained through adding operation.

$$S = \sum_{j=1}^{m} SL_j \qquad (2)$$

When the knock strength is obtained in step 105 it is compared with a predetermined value obtained in step 106 for knock determination. When it is judged that the knock strength obtained in step 105 is larger than the predetermined value, the occurrence of a knocking is identified in step 107.

Then, a knock flag "1" indicative of the occurrence of a knocking is set in step 108. This knock flag is utilized in an ignition control task which is activated separately.

On the other hand, when the knock strength is judged to be smaller than the predetermined value at step 106, assuming that no knocking is taking place, it is judged in step 109 whether each background level $BGL_i$ is larger than a predetermined limit value, namely in this embodiment, lower limiter $BGLMT_i$. Thereby, in this embodiment of the invention, $BGL_1 \ldots BGL_8$ are compared with corresponding $BGLMT_1 \ldots BGLMT_8$, respectively.

When a background level is judged in step 109 to be greater than the lower limiter $BGLMT_i$, that is, to be a normal background level, the background level $BGL_i$ is updated in step 110.

An update value for this background level $BGL_i$ is obtained by filter processing of the power spectrum of a selected frequency. More specifically, it is obtained for each one of the selected frequencies by calculating the following equation, $$BGL_i = BGL_i \times (1-\alpha) + f_i \times \alpha$$

In contrast, when the background level $BGL_i$ is judged in step 109 to be smaller than the lower limiter $BGLMT_i$, that is, the background level $BGL_i$ decreases abnormally, the lower limiter $BGLMT_i$ is set instead thereof in step 111 to be utilized as a $BGL_i$ in the next step 104 to follow.

Then, in step 112, the knock flag is set to "0".

Through the hereabove processing the knock detection routine is accomplished, then the knock flag set in this routine is utilized in the ignition control task. In addition, although the lower limiter herein is also utilized as a threshold value for background level determination, they may be provided separately.

The lower limiter $BGLMT_i$ will be described in detail in the following.

Various modifications of the lower limiter $BGLMT_i$ of the invention may be considered, but the most typical examples of which will be such methods: one is by storing data; the other is through calculation thereof. They will be described more specifically in the following.

Figure 10:
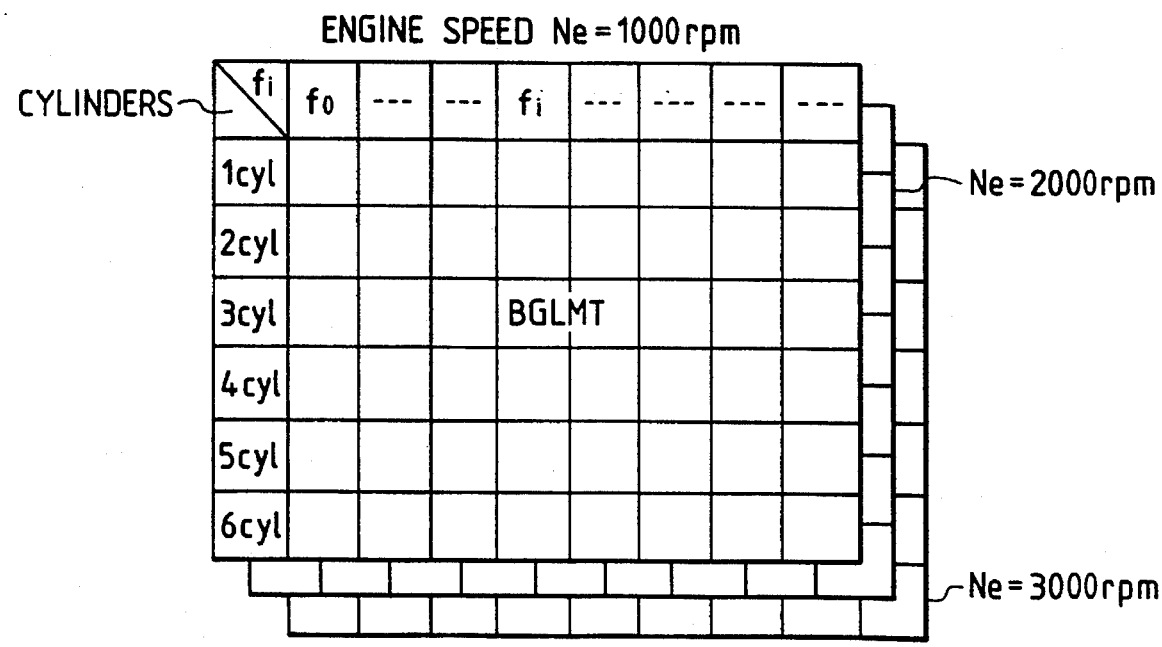
FIG. 10 shows lower limiter maps.

With reference to FIG. 10, a method for setting of a lower limiter $BGLMT_i$ according to mapping is shown, where it is set for respective engine speeds such as 1000 rpm, 2000 rpm, 3000 rpm ... in this embodiment, and corresponding to respective cylinders (from 1 to 6 cylinders in this example) and respective resonance frequencies ($f_0 \ldots f_i$).

By adopting such mapping according to the invention, it is possible to set a very high-precision $BGLMT_i$.

Figure 11:
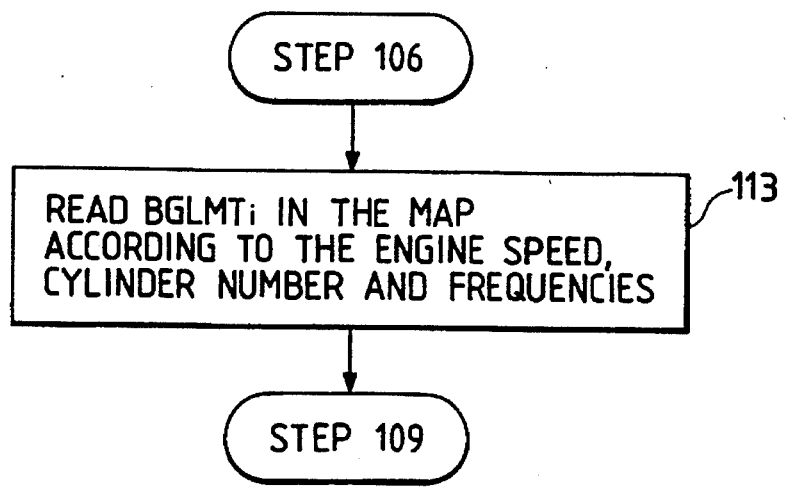
FIG. 11 is a flowchart for reading out a lower limiter.

Further, these three parameters of the engine speeds, cylinder numbers and frequencies cited hereabove are not limited thereto, and it should be construed that it is also possible to set an appropriate $BGLMT_i$ with at least one of these parameters. A preferred result has been obtained, however, when the $BGLMT_i$ is set at least for respective frequencies. As a matter of course, it is possible for any $BGLMT_i$ stored in the map in FIG. 10 to be retrieved through step 113 in FIG. 11 by referring to a corresponding engine speed, cylinder number, and frequency. The step 113 shown in FIG. 11 is inserted for execution thereof between steps 106 and 109 in FIG. 1.

On the other hand, with reference to FIGS. 12 and 13, the method for obtaining $BGLMT_i$ by calculation will be described in the following.

Figure 12:
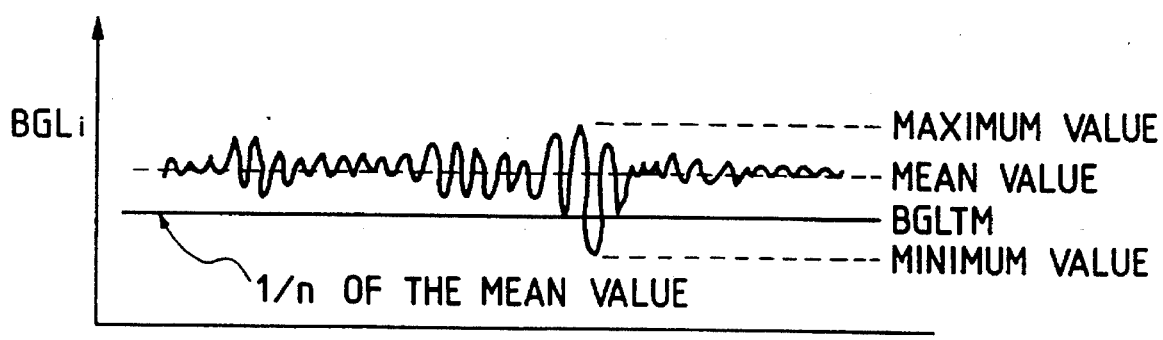
FIG. 12 illustrates a calculation method for calculating a lower limiter.

FIG. 12 is a schematic diagram to help understand an underlying concept thereof. A maximum value and a minimum value are obtained for each frequency thereby to derive a mean value $BGL_{mean}$. Then, this mean value $BGL_{mean}$ is divided into by n (n=integer) so as to provide a lower limiter $BGLMT_i$.

Figures 13, 14:
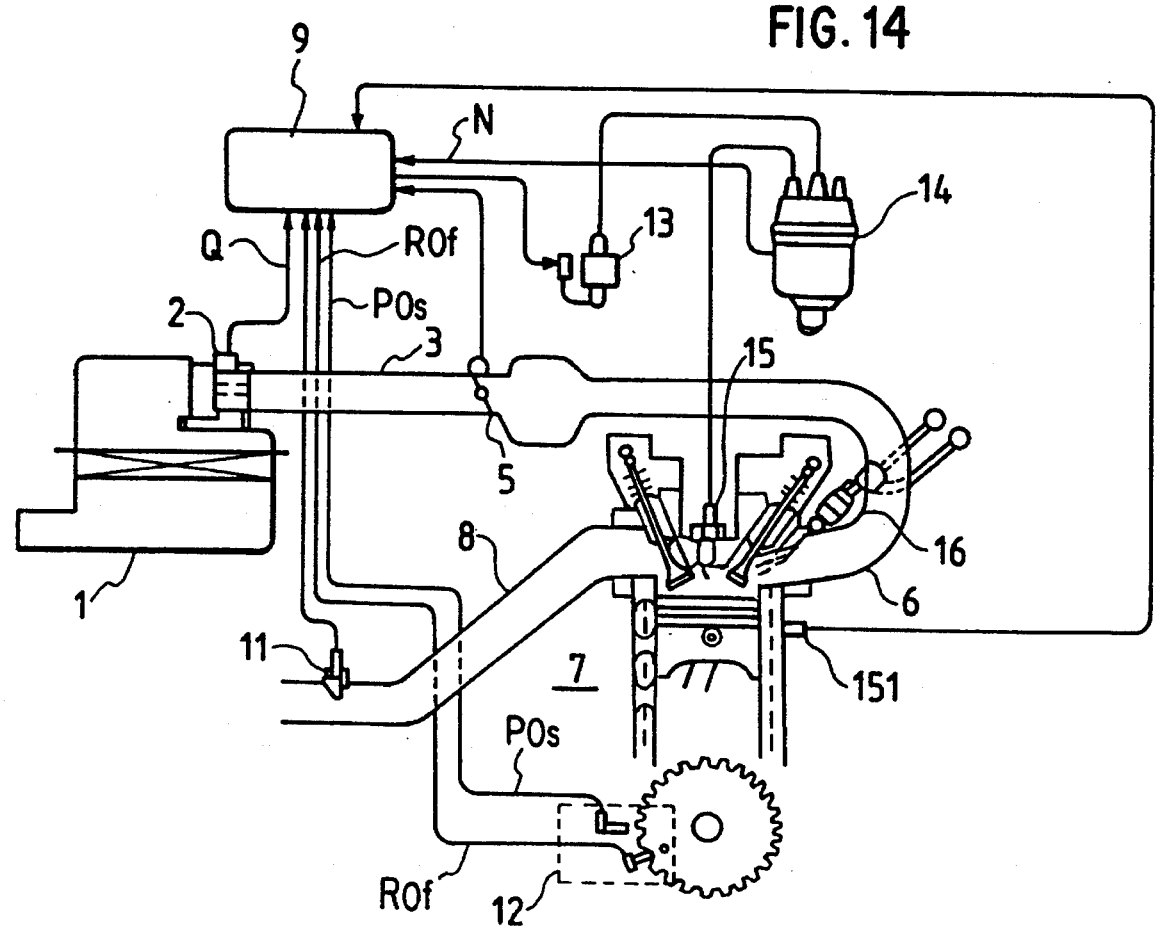
FIG. 13 is a flowchart illustrative of arithmetic operation of a lower limiter.
FIG. 14 shows a system configuration of the invention.

How to obtain these mean value $BGL_{mean}$ and lower limiter $BGLMT_i$ are described more specifically in steps 114 and 115 in FIG. 13, where in step 114 a maximum value of the background level $BGL_{UP}$ and a minimum value of $BGL_{BP}$ are added and divided by 2 for each frequency, then summed up from 1 to m (for example, 16 times), then divided by m to obtain the $BGL_{mean}$, next in step 115 thusly obtained $BGL_{mean}$ is divided by n thereby to obtain the lower limiter $BGLMT_i$. As a matter of course, it is possible to obtain respective $BGLMT_i$ corresponding to respective cylinder numbers, engine driving conditions as well.

Steps 114 and 115 in FIG. 13 are inserted for execution between step 106 and step 109 in FIG. 1.

By way of example, regarding a constant 1/n used in obtaining the lower limiter $BGLMT_i$ from the mean value $BGL_{mean}$, a ⅓ is found to be able to provide the best $BGLMT_i$.

The knock signal indicative of the knock occurrence thus obtained is utilized in the ignition task which will be described in detail in the following.

FIG. 14 shows a system configuration diagram of the ignition apparatus. Air is introduced through an intake port of an air cleaner 1, then passes through an air duct 3, a throttle body 5 having a throttle valve, and an air supply tube 6 to be admitted into the cylinders of an engine 7. An inlet air quantity is detected by a hot wire air flow sensor 2 mounted on the air duct 3, and a detected signal is input into a control unit 9.

On the other hand, fuel supplied from a fuel tank (not shown) is injected through an injector 16, mixed with intake air in the intake passage, then supplied into the cylinders of the engine 7. Air fuel mixture is compressed by the engine 7, ignited by an ignition plug 15, then after explosion the exhaust gas is exhausted from an exhaust pipe 8. An exhaust sensor 11 is mounted on the exhaust pipe 8, and a detected signal detected thereby is input into the control unit 9.

A high voltage generated by an ignition coil 13 is distributed to each cylinder by a distributor 14 to be supplied to each ignition plug 15. An engine speed is detected by a crank angle sensor 12. The crank angle sensor 12 outputs a reference signal Ref indicating an absolute position for every rotation thereof and a $P_{OS}$ signal indicating a position thereof which is shifted by a predetermined angle from said absolute position. The Ref signal and the $P_{OS}$ signal are input into the control unit 9 as well. A vibration sensor 151 is mounted on the engine 7 for detection of vibration thereof, and a detection signal therefrom is input into the control unit 9.

The control unit 9 in response to signals from respective sensors calculates an optimum fuel supply quantity, ignition timing and the like, then outputs a control signal thus calculated to the injector 16 and the ignition coil 13 respectively.

Figure 15:
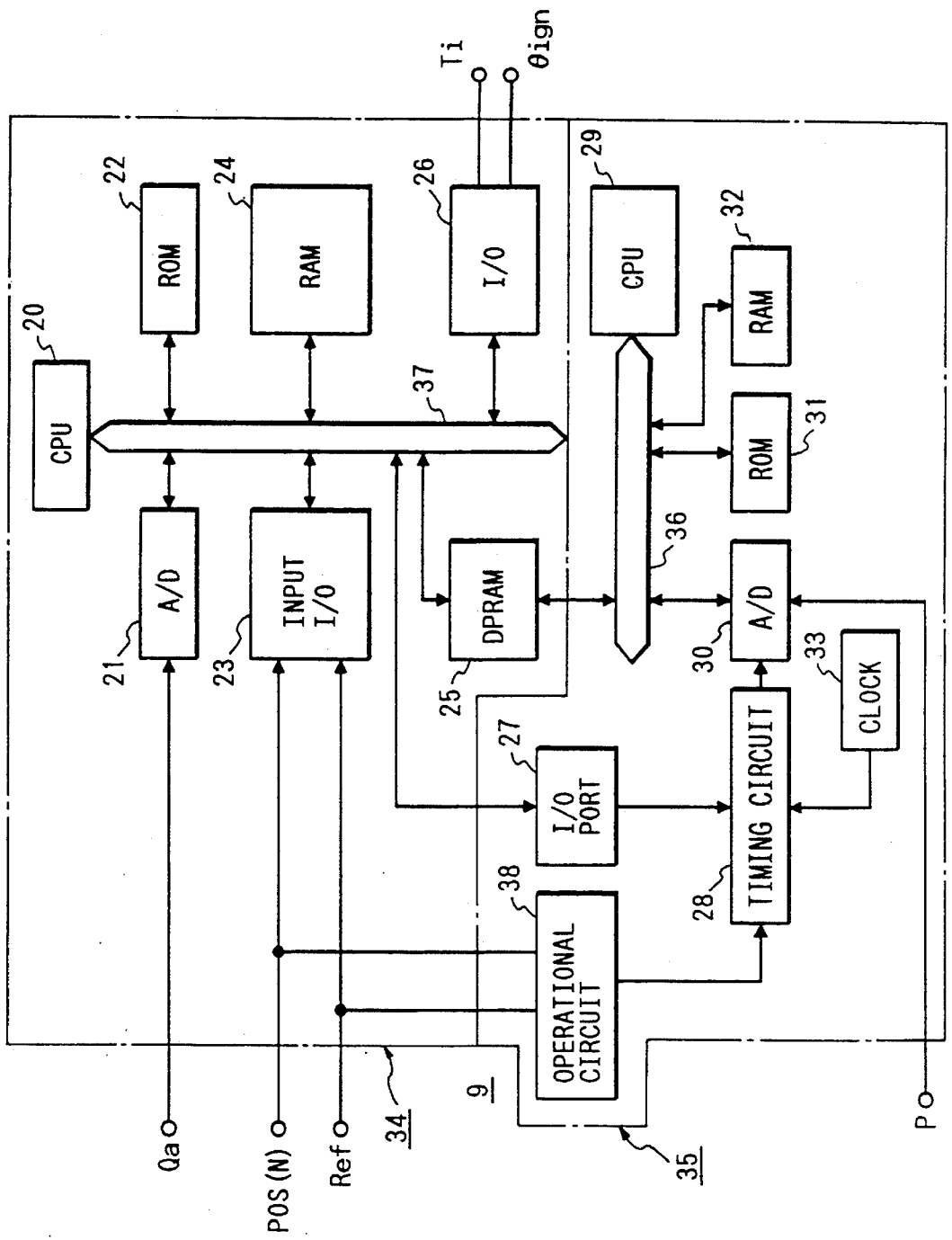
FIG. 15 shows a schematic block diagram of a control unit of the invention.

FIG. 15 shows in detail a configuration diagram of the control unit 9 of the invention. The control unit 9 is divided into two blocks of a control block 34 and a knocking detecting block 35: the control block 34 comprising a CPU 20, an A/D converter 21, a ROM 22, an input I/O 23, a RAM 24, a DPRAM 25, an output I/O 26 and a bus 37; and the knocking detecting block 35 comprising a CPU 29, a port 27, a timing circuit 28, an A/D converter 30, a ROM 31, a RAM 32, a clock 33, an operational circuit 38 and a bus 36. By way of example, exchange of data between the CPU 20 and CPU 29 is executed through the DPRAM 25 which is a dual port RAM.

An intake air flow $Q_a$ detected by the hot wire air flow meter 2 is converted into a digital value through the A/D converter 21, then is input into the CPU 20. Further, a Ref signal and a $P_{OS}$ signal detected by the crank angle sensor 12 are input into the CPU 20 through the input I/O 23. The CPU 20 executes arithmetic operation of thus entered signals according to a program stored in the ROM 22, then the result of the arithmetic operation is output through the output I/O 26 as a fuel injection time interval signal $T_i$ which designates a fuel injection amount, and an ignition timing signal $\theta_{ign}$ to respective associated actuators. Data storage for storing data required in the arithmetic operation is implemented by the RAM 24.

On the other hand, when the operational circuit 35 generates a top dead center (TDC) signal, the timing circuit 28 in response to the contents of data input by the CPU 20 through the port 27 divides a frequency signal generated and supplied from the clock 33, then generates on the basis of thus divided frequency signal a sampling signal. Upon occurrence of the sampling signal, the A/D converter 30 converts an output signal from the vibration sensor 15 into a digital value.

Prior art vibration sensors for use in detecting the knocking generally initiate resonance in the vicinity of 13 KHz, however, in this embodiment of the invention, in order to obtain resonance frequency components up to 18 to 20 KHz, such vibration sensors that resonate above 18 KHz are utilized.

The CPU 29 stores the sampled digital value in the RAM 32 according to the program stored in the ROM 31 as well as executes a frequency analysis thereof on the basis of the data stored according to the flowchart shown in FIG. 1, thereby enabling detection of the occurrence of knocking taking place therein. The result of knocking occurrence detection is transmitted to the CPU 20 through the DPRAM 25.

Figure 16:
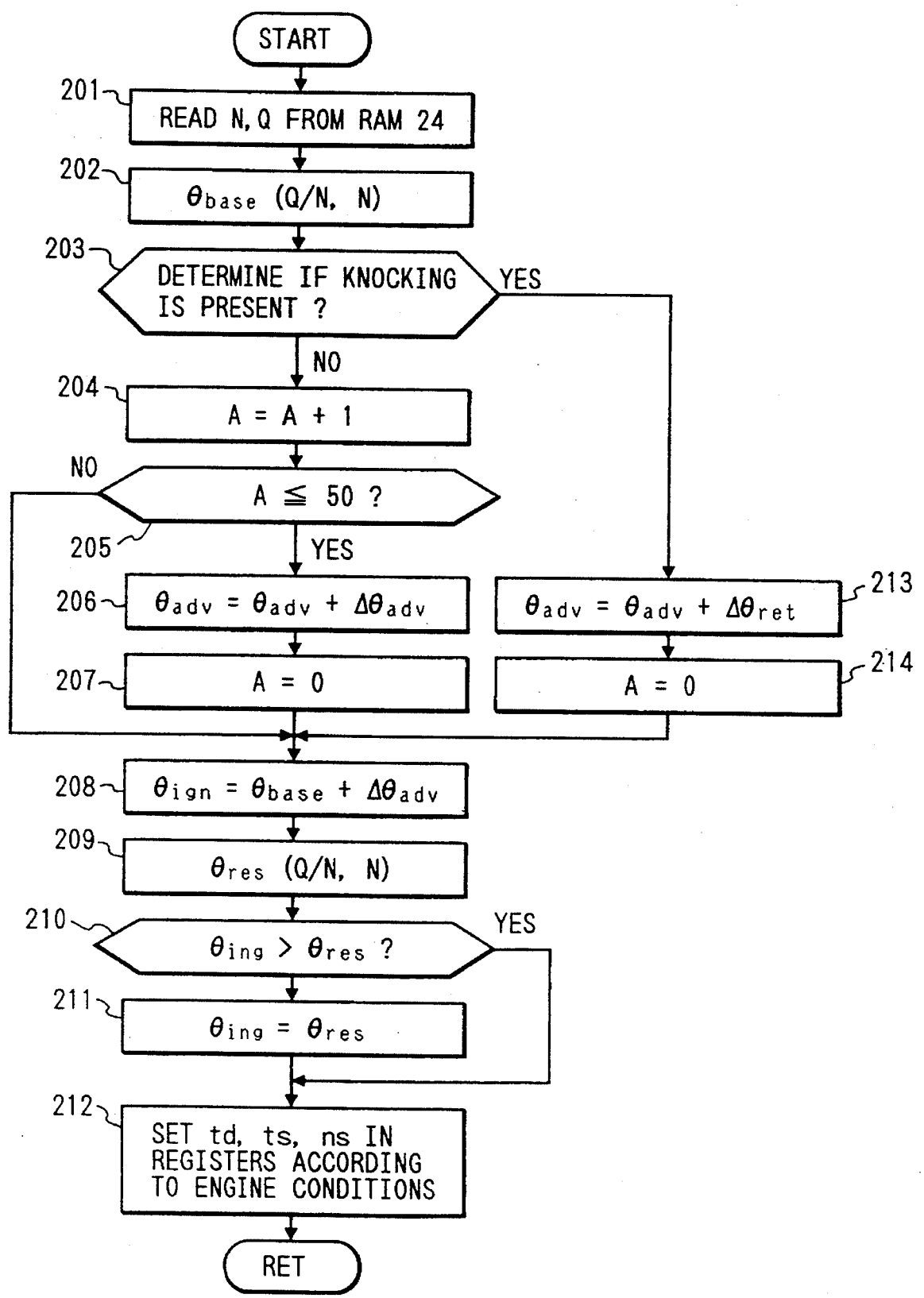
FIG. 16 is a flowchart illustrating ignition calculation according to the invention.

Next, with reference to a flowchart in FIG. 16, an arithmetic operation for obtaining an ignition timing in the CPU 20 will be described in the following. This flowchart operation is activated at a predetermined time cycle, for example, at every 10 msec. In step 201, an engine speed N and an intake air quantity Q are read out from predetermined registers set in the RAM 24. In the next step 202, an intake air quantity per unit engine speed Q/N is calculated, then from this Q/N is obtained a fuel injection time width $T_i$, then a basic ignition timing $\theta_{base}$ is obtained from a set of basic ignition timing map stored in the ROM 22 to supply fuel in accordance therewith. In step 203, it is judged whether a knocking has occurred or not according to the contents of the knock flag set in the flowchart of FIG. 1. If a knocking has occurred, a predetermined retard angle quantity $\Delta\theta_{ret}$ is subtracted from an ignition timing $\theta_{adv}$ in step 213. By this subtraction, the ignition timing is retarded. In step 214, the retarded ignition timing retarded as the result of the knocking occurrence is compared with a predetermined speed, for example, 50 (as indicated in step 205) to determine the base for a value to be recovered. Count data A is initialized, then the step advances to 208.

On the other hand, when there occurred no knocking in step 203, the count data A is incremented by 1. The count data A is used to determine whether it is a time for the retarded ignition timing $\theta_{adv}$ retarded due to the occurrence of knocking to be recovered by a leading angle quantity $\Delta\theta_{adv}$. In step 205, it is judged whether the count data A equals a predetermined value 50. Since the flowchart of FIG. 16 is activated every 10 msec, it is 0.5 sec after initialization of the counter data A when the count data A becomes equal to 50, thus it is recovered every 0.5 sec. When the count data A is not equal to 50 in step 205, the step advances to 206. In step 206, a predetermined leading angle quantity $\Delta\theta_{adv}$ is added to the retard angle value $\theta_{adv}$. By this addition, the ignition timing is effectually recovered.

Next, in step 208, an ignition timing $\theta_{ign}$ is calculated by adding the ignition timing $\theta_{adv}$ hereinabove obtained to the basic ignition timing $\theta_{base}$. In step 209, a maximum lead angle value $\theta_{res}$ is obtained corresponding to the engine speed N and the unit value Q/N of the intake air quantity to engine speed. Obtaining of the maximum lead angle value $\theta_{res}$ is executed by reading from the maximum lead angle value map stored in the ROM 31. In step 210 it is judged whether the ignition timing $\theta_{ign}$ has exceeded the maximum lead angle value $\theta_{res}$ or not. If not, the step advances to 211. If exceeded the maximum lead angle value $\theta_{res}$, the lead angle being too excessive, the maximum lead angle value $\theta_{res}$ is set as an ignition timing $\theta_{ign}$ in step 211.

Finally, after setting of the ignition timing $\theta_{ign}$, a delay time $t_d$, a sampling number $n_s$ and a frequency division ratio $t_s$ corresponding to an engine state are output to the port 27 in step 212.

By way of example, according to the frequency division ratio $t_s$, a sampling cycle for sampling output digital values from the vibration sensor is determined, and according to the sampling number $n_s$ the number of sampling is determined.

As hereinabove set forth, through detection of knocking from the plurality of resonance frequency components and by controlling the ignition timing appropriately responsive thereto, the occurrence of knocking in the engine can be eliminated.

For the hereinabove knock occurrence signals to be utilized in the ignition control task there is set basically for each frequency a lower limiter $BGLMT_i$ as shown in FIGS. 1, 10, 12. However, if any particular resonance frequency band is known in advance in which the background level is anticipated to fall abnormally, it is possible to set a lower limiter corresponding to such frequency band alone. For example, with reference to FIG. 6, if it is known in advance that background levels corresponding to resonance frequencies $f_1$ and $f_2$ will fall, only the lower limiters $BGLMT_1$ and $BGLMT_9$ alone may be set.

Further, in case a full range of lower limiters $BGLMT_i$ as in FIG. 10 cannot be prepared because of the limits in terms of amounts of calculation involved and map capacity required, the following alternate method may be adopted.

That is, a limited number of representative lower limiters BGLMTs corresponding to typical resonance frequencies, representative cylinders or some typical engine driving conditions may be selected to be set for use in common.

Figures 17, 18:
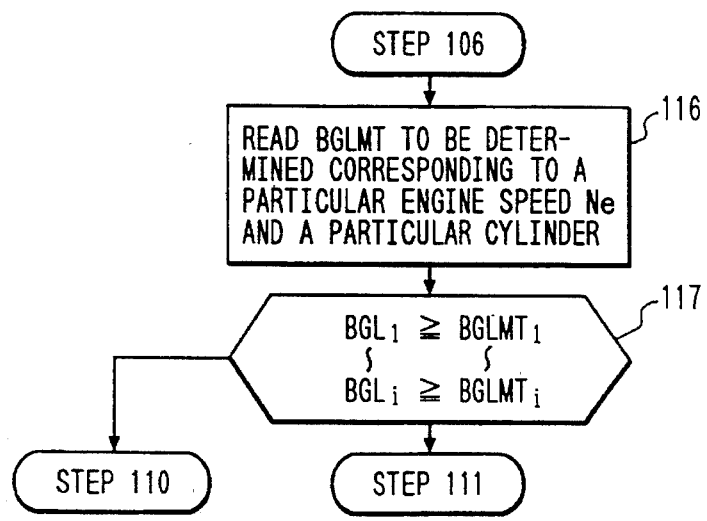
FIG. 17 shows a lower limiter map.
FIG. 18 is a flowchart for reading out a lower limiter.

First, FIG. 17 illustrates setting of lower limiters BGLMTs with respect to a particular typical resonance frequency.

A map in FIG. 17 is prepared corresponding both to respective cylinders and respective engine speeds with respect to a particular resonance frequency $f_r$=6.3 KHz.

Thereby, a lower limiter BGLMT determined corresponding to a particular cylinder number and a particular engine speed is used in common for comparison with each background level $BGL_i$ corresponding to the selected resonance frequency.

That is, in step 116 shown in FIG. 18, a corresponding lower limiter BGLMT is retrieved corresponding to a specific engine speed and a specific cylinder number from the map of FIG. 17. Then, in step 117, a comparison is carried out for each resonance frequency $BGL_i$ with the common lower limiter BGLMT. These two steps are inserted between steps 106 and 109 in FIG. 1. As a matter of course, step 117 is intended to replace step 109. Further, it should be construed that $BGLMT_i$ in step 111 is a common lower limiter BGLMT.

Figures 19, 20:
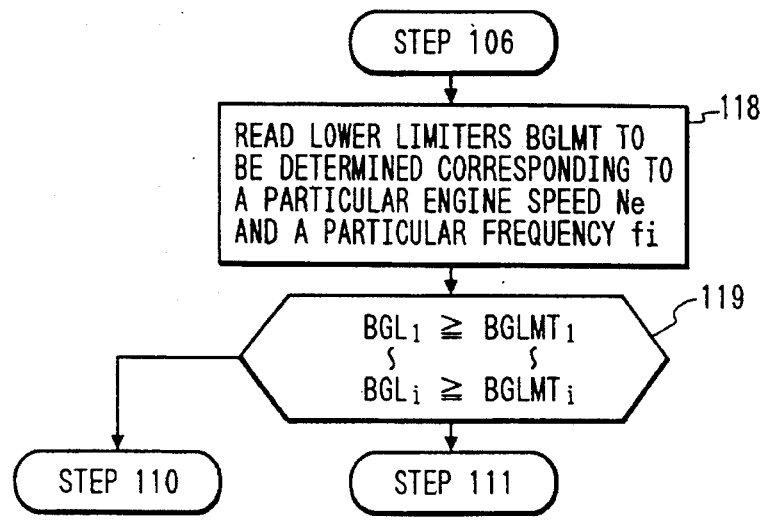
FIG. 19 shows a lower limiter map.
FIG. 20 is a flowchart for reading out a lower limiter.

FIG. 19 shows an example of a map prepared corresponding to respective frequencies and respective engine speeds with respect to a particular number of cylinders 3.

Thereby, a lower limiter BGLMT to be determined at a cross point corresponding to a respective frequency and a respective engine speed is used for comparison with each background level $BGL_i$ of the selected resonance frequency.

Namely, as shown in FIG. 20, a corresponding lower limiter BGLMT corresponding to a specific engine speed and a specific frequency is retrieved from the map of FIG. 19, then in step 119 a comparison of the corresponding lower limiter BGLMT with a background level is carried out for respective resonance frequency. Thereby, since it is used in common as the lower limiter for each cylinder, these steps are inserted between steps 106 and 109 in FIG. 1. Step 119 is intended to replace step 109.

Figures 21, 22:
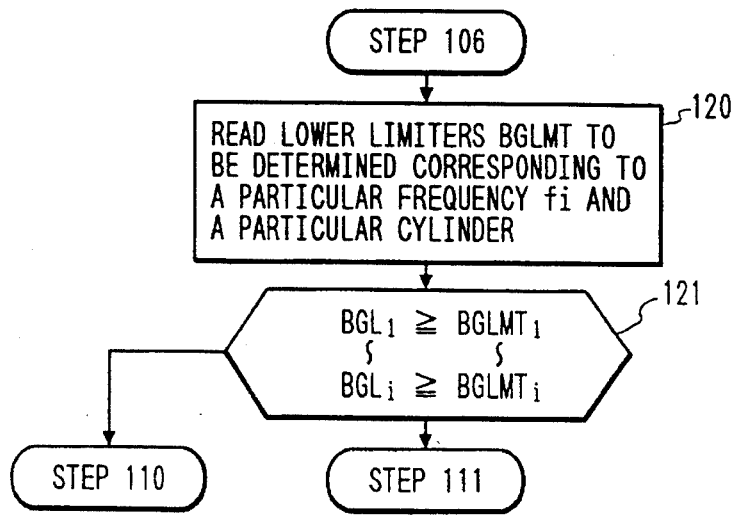
FIG. 21 shows a lower limiter map.
FIG. 22 is a flowchart for reading out a lower limiter.

FIG. 21 shows an example of a map formulated corresponding to respective resonance frequencies and respective cylinders, intended for use in a specific driving condition of the engine. That is, the specific engine speed selected herewith is used as a parameter in common.

Thereby, a lower limiter BGLMT to be determined at a position in coincidence corresponding to a particular frequency and a particular cylinder number is used in common for comparison with a respective background level $BGL_i$ of the selected resonance frequency.

Namely, in step 120 in FIG. 22, a corresponding lower limiter BGLMT corresponding to a specific frequency and a specific cylinder number is retrieved from the map of FIG. 21, then in step 121 this corresponding lower limiter BGLMT is used for comparison with a background level for respective resonance frequencies. Thereby, since it is used in common as the lower limiter for the selected engine speed, these steps are inserted between steps 106 and 109 in FIG. 1. It should be construed, however, that the step 121 replaces the step 109.

When it is required further to reduce the calculation loads and mapping memory capacities, it is also possible to set up the best mode of a lower limiter BGLMT obtainable in the most desirable conditions with respect to the resonance frequencies, cylinder numbers and engine speeds, respectively.

That is, only one lower limiter BGLMT is effected to be set irrespective of respective resonance frequencies, cylinder numbers and engine speeds. Thereby, this only one lower limiter is stored alone in a ROM area.

Figure 23:
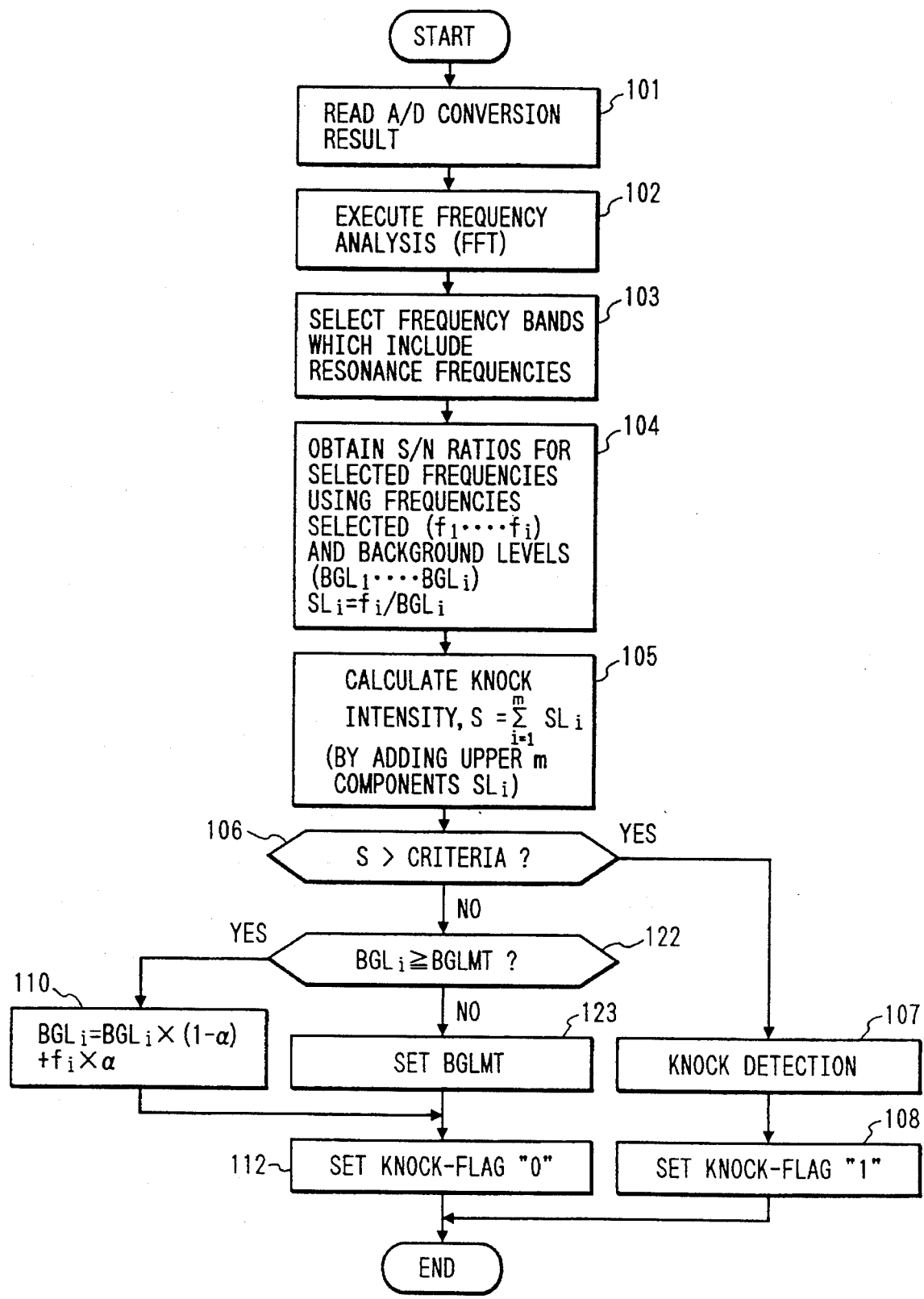
FIG. 23 is a flowchart illustrating another embodiment of the invention.

With reference to FIG. 23, another embodiment of the invention will be set out in the following. Since the basic configuration thereof is the same as in FIG. 1, only the gist thereof will be described.

In FIG. 23, step 122 is executed when it is judged in step 106 that no knocking has occurred, and in step 122 the singular lower limiter BGLMT thus set hereinabove irrespective of respective resonance frequencies, cylinder numbers, engine speeds is effected to be compared with a background level $BGL_i$ corresponding to each resonance frequency. When it is judged as a result of the comparison that any background level $BGL_i$ is smaller than the lower limiter BGLMT, the lower limiter BGLMT is set up in step 123 instead thereof so as to ensure that in the next recurring step 104 the $BGL_i$ is replaced by the BGLMT and each S/N ratio is obtained thereby for each frequency.

Further, the concepts and methods of the invention described in FIGS. 17 through 23 may be implemented by calculations as well, according to the calculational method as specified in FIG. 13.

Still further, a method for obtaining the background level $BGL_i$ in the various embodiments of the invention described heretofore is based on the following equation for applying a filter processing to a signal intensity $f_i$, $$\begin{aligned} BGL_i &= BGL_i \times (1-\alpha) + f_i \times \alpha \\ &= BGL_i - BGL_i \cdot \alpha + f_i \cdot \alpha \\ &= BGL_i + \alpha(f_i - BGL_i) \ldots \text{delay filter equation.} \end{aligned}$$

However, it may be obtained by the usual integral method of integrating background level measurement as well.

Further, although the power spectrum $SL_i$ is obtained from the S/N ratio, it may be obtained as well from a difference from the background level $BGL_i$, i.e., $SL_i = f_i - BGL_i$. Thereby, a knock strength S may be obtained by adding up this difference.

Still further, although it is judged that there occurred knocking when an added value of the power spectra of the plurality of frequencies exceeds a preset value, there may be provided a logic which prescribes the occurrence of a knocking if any one of the power spectra of the plurality of frequencies exceeds a preset value, without going through addition of respective power spectra.

In the next, there will be described a compensation method for compensating for a side effect occurring when the background level $BGL_i$ is obtained through the filter processing thereof.

Since the background level $BGL_i$ in the one embodiment of the invention shown in FIG. 1 is obtained through the delay filter processing, there arises a problem in a transient state of the engine such as acceleration or the like that the background level $BGL_i$ cannot follow up the transient state and thereby that an apparent S/N increases.

The lower limiter $BGLMT_i$ according to the present invention is effective also to deal with such follow-up delays of $BGL_i$ as well, but it is further advantageous to change the lower limiter $BGLMT_i$ according to acceleration and steady state operation.

Figure 24:
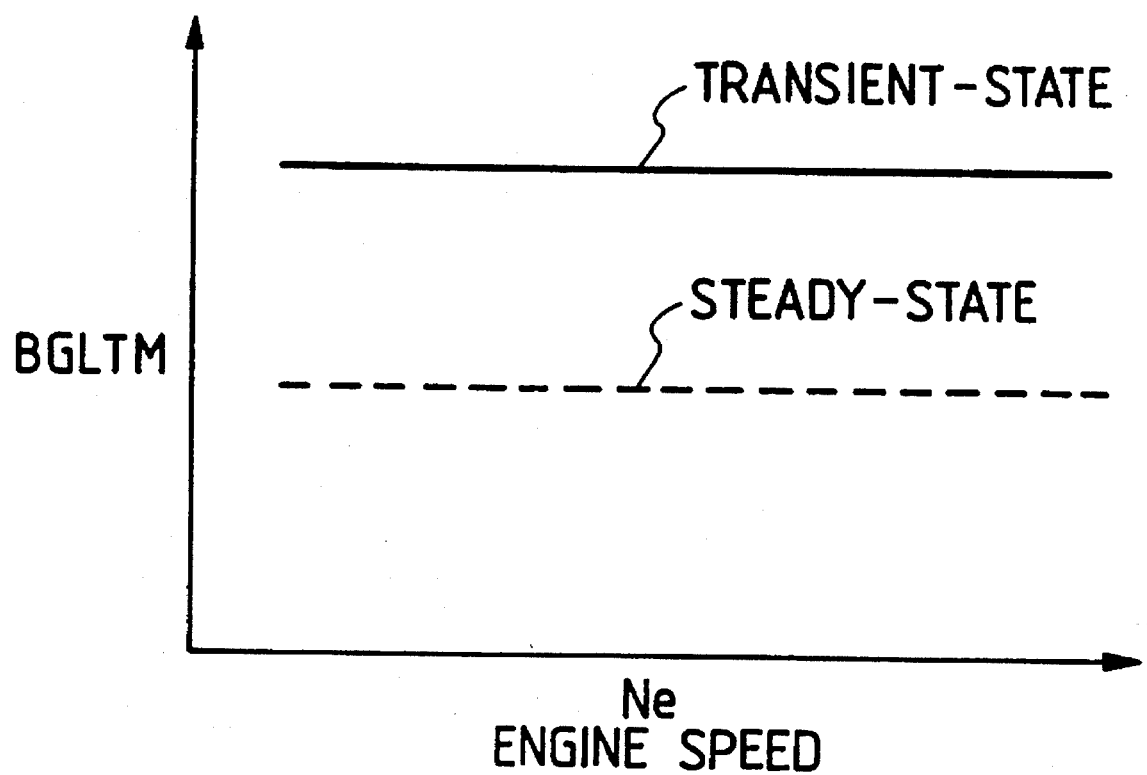
FIG. 24 is a diagram illustrative of switching between lower limiters.

FIG. 24 shows transient-state and steady-state lower limiters $BGLMT_i$, where the transient-state limiter is set at a larger value.

Figure 25:
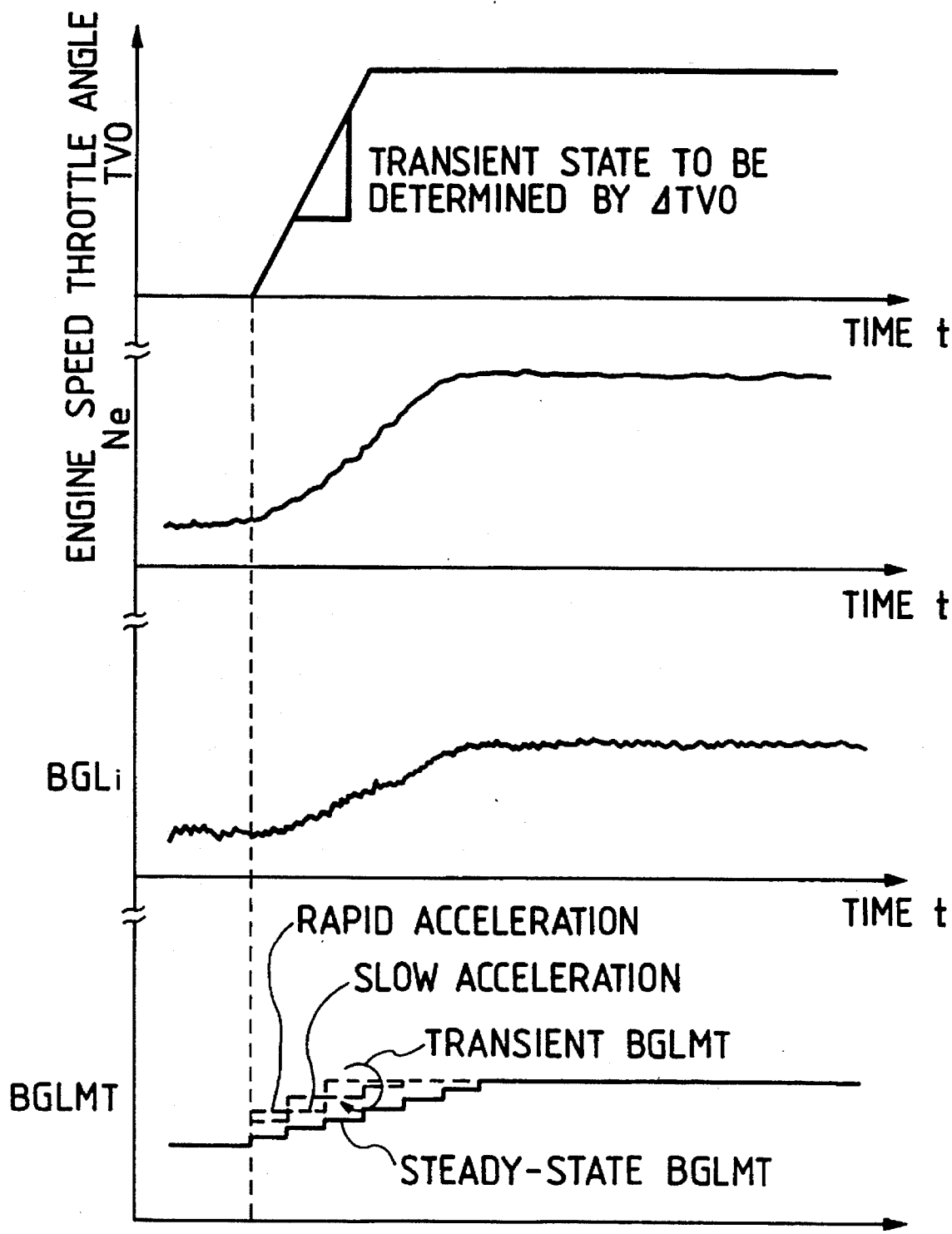
FIG. 25 is a chart diagram explaining acceleration steps.

FIG. 25 shows changes, in a transient state, of the throttle valve opening, engine speeds, background level $BGL_i$ and lower limiter $BGLMT_i$, wherein it is judged according to a degree of the throttle valve opening per unit period of time whether is a rapid acceleration or a slow acceleration, and depending on either it is a rapid acceleration or a slow acceleration a magnitude of the lower limiter $BGLMT_i$ is adjusted. This adjustment is effected either by multiplying the lower limiter $BGLMT_i$ for use in the steady-state operation by a constant or adding thereof.

Figure 26:
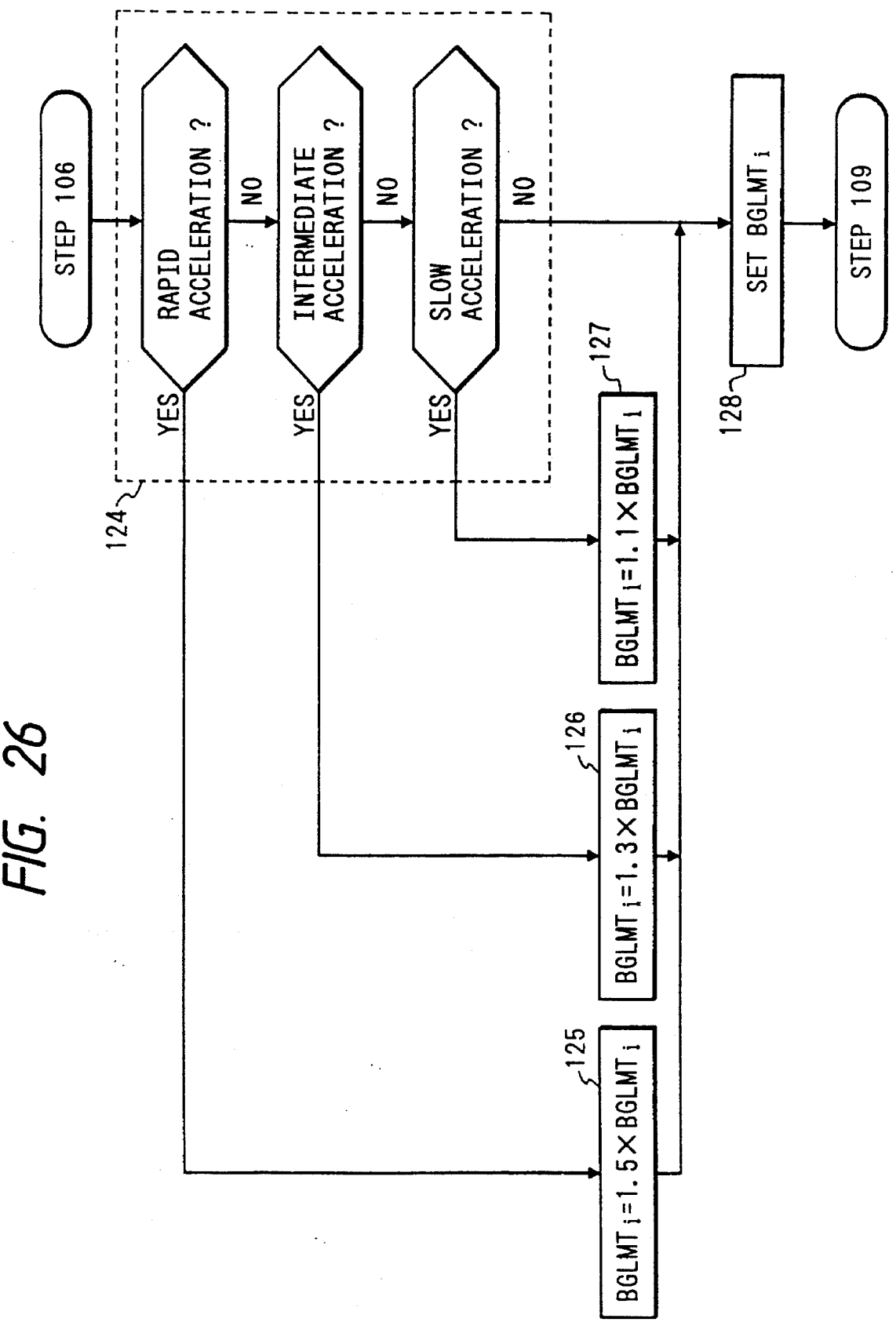
FIG. 26 is a flowchart illustrating still another embodiment of the invention.

The foregoing flowchart will be described with reference to FIG. 26, where in step 124 a degree of throttle opening is determined in what level it is; if it is a rapid acceleration, intermediate acceleration, slow acceleration or any other driving condition. Then, when it is judged to be a rapid acceleration in step 125, the steady-state lower limiter $BGLMT_i$ is multiplied by a coefficient 1.5, when it is judged to be an intermediate acceleration in step 126 the steady-state lower limiter $BGLMT_i$ is multiplied by a coefficient 1.3, when it is judged to be a slow acceleration in step 127 the steady-state lower limiter $BGLMT_i$ is multiplied by a coefficient 1.1, and when it is judged to be a steady coursing, the lower limiter $BGLMT_i$ is set as it is in step 128. These steps are inserted for execution between steps 106 and 109 in FIG. 1.

Through such arrangement, an appropriate lower limiter $BGLMT_i$ can be obtained for various driving conditions of the engine.

In the embodiments of the invention described heretofore, attention has been directed to such cases where the background level abnormally drops. However, there may also take place such a phenomenon where the background level abnormally rises.

In such a case as above, an effective countermeasure can be provided by setting up an upper limiter instead of the lower limiter likewise in step 109 in the foregoing embodiment of the invention.

In this case also, it should be construed that the upper limiter can take a variety of modifications of value likewise the case of the lower limiter.

Further, it will be more advantageous to provide for a countermeasure against such inconveniences anticipated to take place as will be described in the following.

Namely, gain of the background level indicating an amplification degree thereof is switched, for example, to ½ at a predetermined timing by means of hardware, and in line with this switching the power spectrum of each frequency is switched to ½ by means of software.

However, when the power spectrum of each frequency happens to drop abnormally, although the background gain is ensured to be switched by the hardware, there occurs sometimes a problem that the power spectrum of each frequency fails in switching due to an error in quantization, consequently increasing the S/N ratio abnormally, thereby causing an erroneous knocking detection.

Figure 27:
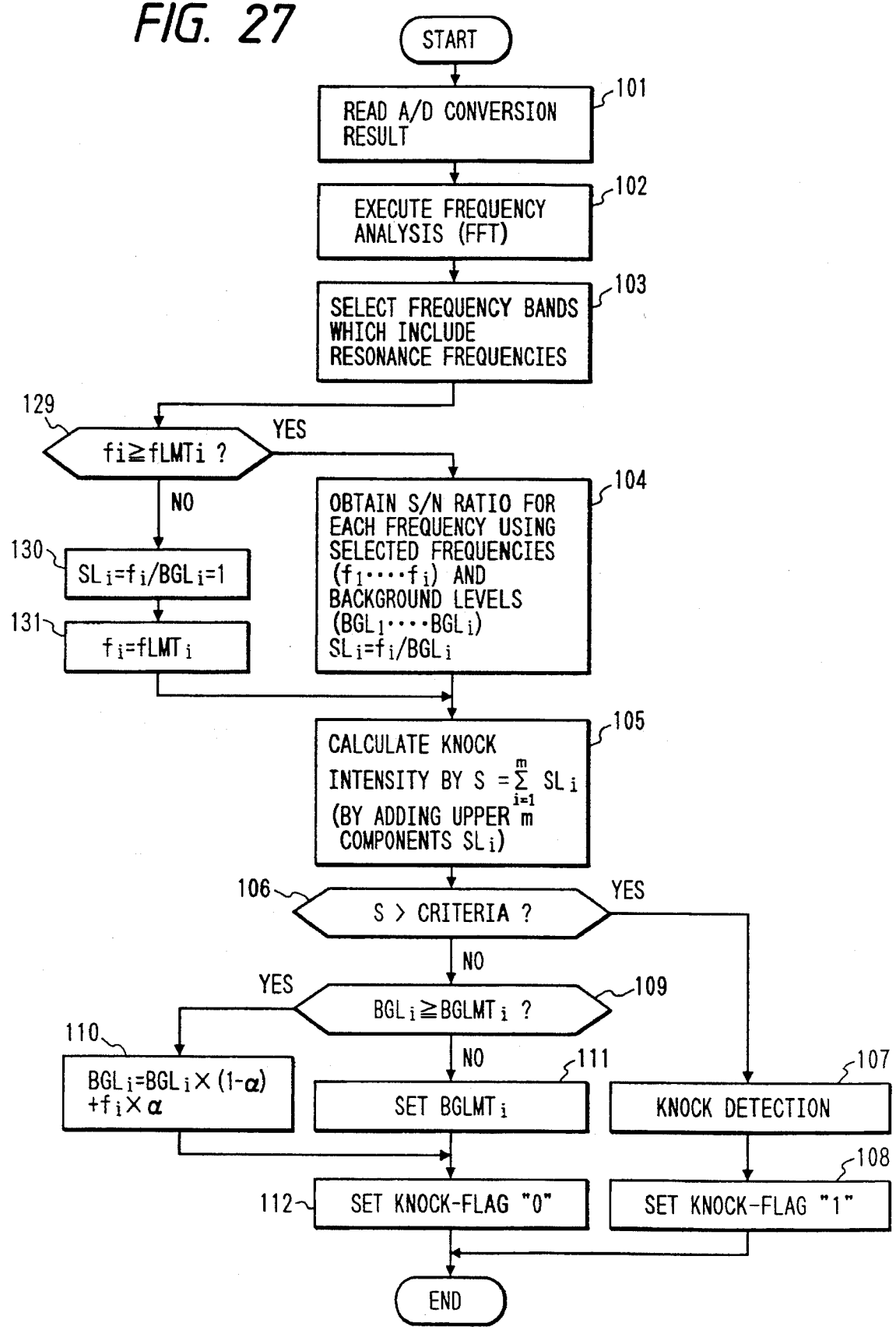
FIG. 27 is a flowchart illustrating further embodiment of the invention.

In order to solve such problems, the following steps are added between steps 103 and 105 in FIG. 27 according to the invention.

First, in step 129 following step 103 it is judged for each frequency $f_i$ whether its strength is larger than/equal to a preset lower limiter $fLMT_i$, or not. If it is judged here to be larger/equal thereto, the step advances to 104 where to execute an ordinal S/N ratio calculation.

On the other hand, in step 129 following step 103 if it is judged for each frequency $f_i$ that its strength is smaller than a preset lower limiter $fLMT_i$, the step advances to 130 where an S/N ratio of the frequency spectrum $f_i$ to the background level is set at "1". That is, there is executed a processing thereby for assuming that no knocking is present with respect to the corresponding frequency.

Next in step 131, the corresponding frequency spectrum is replaced by the predetermined lower limiter $fLMT_i$, then the step advances to 105 where a knock strength calculation is executed.

As hereinabove stated, the problem associated with the prior art that S/N ratio increases abnormally due to the quantization error taking place when the intensity of each frequency drops abnormally can be solved by setting a lower limiter instead of that erroneous frequency intensity.

Also in this preferred embodiment of the invention, it should be construed that the value of a lower limiter corresponding to each frequency may take a variety of modified value likewise the foregoing embodiment of the background lower limiter.

The merits and advantageous effects according to the present invention will be summarized as follows. Even if the background level is varied abnormally, because of the arrangement of the invention, the abnormally changing background level is altered to a predetermined limit value, thereby ensuring effective information indicative of a knocking occurrence to be obtained.

Thereby, such problems can be solved that take place when notwithstanding that the plurality of resonance frequencies are sampled for detection of the occurrence of any knocking, if there happens an error signal indicating the occurrence of a false knocking in at least one of the frequency bands, the error signal adversely affects the general judgement on the knocking based on the resonance frequencies in general, thereby in consequence remarkably improving reliability of knock detection apparatus.

Having described our invention as related to the embodiment shown in the accompanying drawing, it is our intention that the invention be not limited by any of the details of description, unless otherwise specified, but rather be construed broadly within its spirit and scope as set out in the accompanying claims.

What is claimed is:

1. A knocking detection method for detecting a knocking in an internal combustion engine, the method comprising the steps of:

extracting a plurality of characteristic components indicative of a knocking from physical quantities relating to a knocking state in the internal combustion engine, and a comparison component to be defined according to said physical quantities;

extracting information on the occurrence of a knocking from a relationship between said plurality of characteristic components and said comparison component; and substituting a predetermined limit characteristic component for any of said characteristic components which is judged to be outside a permissible extent of value thereof.

2. A knocking detection method for detecting a knocking in an internal combustion engine, the method comprising the steps of:

extracting a plurality of characteristic components indicative of a knocking from physical quantities relating to a knocking state in an internal combustion engine, and a plurality of comparison components to be defined according to said physical quantities corresponding to said respective plurality of characteristic components;

extracting information on the occurrence of a knocking from a relationship between said plurality of characteristic components and said plurality of comparison components;

judging whether any one of said plurality of characteristic components is outside a permissible extent of value or not; and substituting a predetermined limit characteristic component for said any one of plurality of characteristic components when the same is judged to be outside said permissible extent of value thereof.

3. A knocking detection method for detecting a knocking in an internal combustion engine, the method comprising the steps of:

extracting a plurality of characteristic components indicative of a knocking from physical quantities relating to a knocking state in an internal combustion engine, and a plurality of comparison components to be defined on the basis of said physical quantities respectively corresponding to said plurality of characteristic components;

extracting information on the occurrence of a knocking from a relationship between said plurality of characteristic components and said plurality of comparison components corresponding thereto;

judging whether all of said plurality of characteristic components is within a permissible extent of value corresponding thereto or not; and substituting a predetermined limit characteristic component for any one of the characteristic components which is outside the permissible extent of value.

4. A knocking detection method for detecting a knocking in an internal combustion engine, the method comprising the steps of:

extracting a plurality of characteristic components indicative of a knocking from physical quantities relating to a knocking state in the internal combustion engine, and a plurality of comparison components to be defined on the basis of said physical quantities respectively corresponding to said plurality of characteristic components;

extracting information on the occurrence of a knocking from a relationship between said plurality of characteristic components and said plurality of comparison components corresponding thereto;

judging whether all of said plurality of characteristic components is within one permissible limit of value or not; and substituting a predetermined limit characteristic component for any one of the characteristic components which is outside said one permissible limit of value.

5. A knocking detection method for detecting a knocking in an internal combustion engine, the method comprising the steps of:

extracting a plurality of characteristic components indicative of a knocking from physical quantities relating to a knocking state in an internal combustion engine, and a comparison component to be defined on the basis of said physical quantities;

extracting information on the occurrence of a knocking from a relationship between said plurality of characteristic components and said comparison component; and substituting a limit characteristic component for said plurality of characteristic components when said characteristic components are smaller than the limit characteristic component.

6. A knocking detection method for detecting a knocking in an internal combustion engine, the method comprising the steps of:

extracting a plurality of characteristic components indicative of a knocking from physical quantities relating to a knocking state in an internal combustion engine, and a plurality of comparison components to be defined on the basis of said physical quantities respectively corresponding to said characterizing components;

extracting information on the occurrence of a knocking from a relationship between said plurality of characteristic components and said plurality of comparison components corresponding thereto; and substituting a limit characteristic component to be utilized in common for any one of said plurality of characterizing components when said any one of the plurality of characteristic components becomes smaller than said limit characteristic component.

7. A knocking detection method for detecting a knocking in an internal combustion engine, the method comprising the steps of:

extracting a plurality of characteristic components indicative of a knocking from physical quantities relating to a knocking state in an internal combustion engine, and a plurality of comparison components to be defined on the basis of said physical quantities respectively corresponding to said characterizing components;

extracting information on the occurrence of a knocking from a relationship between said plurality of characteristic components and said plurality of comparison components corresponding thereto; and judging whether all of said plurality of characteristic components is smaller than a respective characteristic component corresponding thereto or not; and substituting said respective limit characteristic component corresponding thereto for any one of the characteristic components which is judged to be smaller than said respective limit characteristic component.

8. A knocking detection method for detecting a knocking in an internal combustion engine, the method comprising the steps of:

extracting a plurality of characteristic components indicative of a knocking from physical quantities relating to a knocking state in the internal combustion engine, and a plurality of comparison components to be defined according to said physical quantities corresponding to said respective plurality of characteristic components;

extracting information on the occurrence of a knocking from a relationship between said plurality of characteristic components and said plurality of comparison components; and substituting a limit characteristic component for said plurality of characteristic components when said characteristic components are smaller than the limit characteristic component.

* * * * *